(12) United States Patent
Greifeneder et al.

(10) Patent No.: US 7,734,637 B2
(45) Date of Patent: Jun. 8, 2010

(54) METHOD AND SYSTEM FOR AUTOMATIC DETECTION OF MONITORING DATA SOURCES

(75) Inventors: Bernd Greifeneder, Linz (AT); Clemens Reithmayr, Linz (AT); Stefan Reiner, Linz (AT)

(73) Assignee: Borland Software Corporation, Rockville, MD (US)

( * ) Notice: Subject to any disclaimer, the term of this patent is extended or adjusted under 35 U.S.C. 154(b) by 0 days.

(21) Appl. No.: 10/678,860

(22) Filed: Oct. 2, 2003

(65) Prior Publication Data

US 2004/0111425 A1 Jun. 10, 2004

Related U.S. Application Data

(60) Provisional application No. 60/431,076, filed on Dec. 5, 2002.

(51) Int. Cl.
*G06F 7/00* (2006.01)
*G06F 17/30* (2006.01)

(52) U.S. Cl. .................. 707/758; 707/781; 707/802; 709/224

(58) Field of Classification Search .......... 707/1–104.1; 709/223, 229; 370/229, 401
See application file for complete search history.

(56) References Cited

U.S. PATENT DOCUMENTS

| | | | | |
|---|---|---|---|---|
| 5,878,420 A * | 3/1999 | de la Salle | .................. | 707/10 |
| 6,000,045 A * | 12/1999 | Lewis | ........................ | 714/47 |
| 6,070,190 A * | 5/2000 | Reps et al. | .................. | 709/224 |
| 6,108,782 A * | 8/2000 | Fletcher et al. | ............. | 713/153 |
| 6,141,699 A * | 10/2000 | Luzzi et al. | ................ | 719/331 |
| 6,321,263 B1 * | 11/2001 | Luzzi et al. | ................ | 709/224 |
| 6,330,564 B1 * | 12/2001 | Hellerstein et al. | .......... | 707/101 |
| 6,515,968 B1 * | 2/2003 | Combar et al. | .............. | 370/252 |
| 6,529,784 B1 * | 3/2003 | Cantos et al. | ................. | 700/79 |
| 6,633,835 B1 * | 10/2003 | Moran et al. | ................ | 702/190 |
| 6,691,067 B1 * | 2/2004 | Ding et al. | .................. | 702/186 |
| 6,798,417 B1 * | 9/2004 | Taylor | ........................ | 345/502 |
| 7,051,098 B2 * | 5/2006 | Masters et al. | .............. | 709/224 |
| 7,120,621 B2 * | 10/2006 | Bigus et al. | .................... | 707/1 |

(Continued)

OTHER PUBLICATIONS

AutoTune: A Generic Agent for Automated Performance Tuning. JP Bigns et al. IBM research center. Pub. 2000.*

(Continued)

*Primary Examiner*—Hosain T Alam
*Assistant Examiner*—Usmaan Saeed
(74) *Attorney, Agent, or Firm*—Kokka & Backus, PC

(57) ABSTRACT

The present invention is directed to a method and system for interfacing with various monitoring information sources from one or more computer systems with minimal user input. Each computer system may include one or more computers as well as any number of devices such as networking devices. Expert knowledge may be embedded in the data source monitoring software. These sources can later be used by data collection tools in order to extract monitoring information and present the information to the user or use it in another way (such as storing it or raising an alert when a certain monitored value exceeds a threshold). Furthermore, the user may decide which sources of information should be monitored by the data collection tools. The user may also use the present invention in order to inform him/herself of the configuration of the system he/she is monitoring.

17 Claims, 11 Drawing Sheets

U.S. PATENT DOCUMENTS

| | | | |
|---|---|---|---|
| 7,152,105 B2* | 12/2006 | McClure et al. | 709/224 |
| 7,167,915 B2* | 1/2007 | Bendich et al. | 709/224 |
| 7,225,250 B1* | 5/2007 | Harrop | 709/224 |
| 7,277,938 B2* | 10/2007 | Duimovich et al. | 709/224 |
| 7,281,040 B1* | 10/2007 | Ly | 709/224 |
| 7,600,007 B1* | 10/2009 | Lewis | 709/223 |
| 2002/0062237 A1* | 5/2002 | Matsumoto et al. | 705/7 |
| 2002/0099818 A1* | 7/2002 | Russell et al. | 709/224 |
| 2002/0105911 A1* | 8/2002 | Pruthi et al. | 370/241 |
| 2002/0128976 A1* | 9/2002 | O'Connor et al. | 705/59 |
| 2002/0177907 A1* | 11/2002 | Hand et al. | 700/1 |
| 2003/0110276 A1* | 6/2003 | Riddle | 709/230 |
| 2003/0167270 A1* | 9/2003 | Werme et al. | 707/10 |
| 2003/0195861 A1* | 10/2003 | McClure et al. | 707/1 |
| 2003/0200294 A1* | 10/2003 | Thorpe et al. | 709/223 |
| 2003/0221006 A1* | 11/2003 | Kuan et al. | 709/225 |
| 2003/0225549 A1* | 12/2003 | Shay et al. | 702/182 |
| 2004/0024767 A1* | 2/2004 | Chen | 707/100 |
| 2004/0039728 A1 | 2/2004 | Fenlon et al. | |
| 2004/0064552 A1* | 4/2004 | Chong et al. | 709/224 |

OTHER PUBLICATIONS

AutoTune: A Generic Agent for Automated Performance Tuning. JP Bigus, JL Hellerstein, TS Jayram, MS Squillante—Practical Application of Intelligent Agents and Multi Agent . . . , 2000—itautec.cin.ufpe.br.*

Tse-Au, E.S.H. Morreale, P.A. End-to-end QoS measurement: analytic methodology of applicationresponse time vs. tunable latency in IP networks. IEEE Meeting Date: Apr. 10, 2000-Apr. 14, 2000.*

Discovery and Application of Network Information. B Lowekamp—2000—reports-archive.adm.cs.cmu.edu.*

International Search Report.

* cited by examiner

METHOD AND SYSTEM FOR AUTOMATIC DETECTION OF MONITORING DATA SOURCES

This application claims the benefit of U.S. Provisional Application No. 60/431,076, filed Dec. 5, 2002.

FIELD OF THE INVENTION

This invention relates generally to computer systems, and more specifically to tools for assisting in the management and monitoring of computer systems and network infrastructure.

BACKGROUND OF THE INVENTION

Complex computer systems, such as e-commerce systems, may include web-servers, file servers, databases, billing servers, etc. Other examples of complex computer systems are Enterprise Resource Planning (ERP) systems, Enterprise Application Integration (EAI) systems, other enterprise applications, distributed applications, infrastructure and telecommunication applications, and many more. Because of their complexity, such computer systems need continued attention from qualified persons to ensure error-free and efficient operation.

The complexity of the system makes errors and possible inefficiencies more likely to occur and harder to find, once they have occurred. As a result, maintenance of these systems can be challenging and time consuming. One aspect of the maintenance of such complex systems is monitoring the performance of all the applications that make up the system.

Computer systems often provide the ability for a person to check various information associated with such systems. This information may include status, throughput, performance, configuration, business, accuracy, availability, security, utilization, geographical, and usability information. This type of information is referred to as monitoring information. Some examples on how monitoring information can be accessed remotely are:

- applications, devices, or operating systems may provide their monitoring information by making use of certain operating system services specifically designed for this purpose. For example, the SNMP agent service or Microsoft's remote registry are designed for being accessed remotely;
- custom tools provided by an operating system or an application, such as command line tools;
- custom services/daemons implemented by some applications or devices that can be accessed locally as well as remotely, such as dynamically generated WebPages which contain HTML formatted monitoring information;
- an application or device may be shipped with tools that query this application or device once it is deployed, and return monitoring information, usually in a non-standardized format;
- a network router or switch may provide monitoring information, such as network traffic statistics, via SNMP;
- a computer may be configured to continuously produce files containing monitoring information pertaining to the system;
- a database may provide monitoring information through standard database-client interfaces such as OCI (Oracle Calling Interface) or ODBC (Open DataBase Connectivity);

In a more specific example, a user may be interested in measuring the utilization of a system's CPU(s). On Microsoft Windows platforms, the user would have to launch a Microsoft specific GUI tool, pick out of a large number of monitoring information options the one which allows the user to query a Microsoft specific service for accessing this kind of utilization information. On other systems it would suffice to execute a command line tool, which produces a tabular text output containing each CPU's utilization. Such tools can be utilized from remote locations and the tabular text output can be transferred back to the caller. For example, Sun operating systems feature the command line tool "mpstat", which provides CPU utilization information. The "mpstat" tool can be remotely executed by using the REXEC protocol, a commonly used remote execution protocol in Sun operating systems and other UNIX operating systems. Thus, in order to remotely retrieve the CPU utilization information from a SunOS powered host a user would need to:

- connect to the host on port 512 using the REXEC protocol (port 512 is the default connection point of the REXEC protocol);
- remotely execute a tool named "mpstat" via REXEC;
- produce tabular text output;
- find the needed utilization information in the tabular output.

A monitoring information service (service) is a service, daemon, tool or any other interface that is able to provide monitoring information concerning a particular computer system. However, these services are not standardized and may be very different for different computer systems. Often a computer system provides monitoring information in such a manner that a user must be very well versed in the configuration of the hardware devices as well as the software applications running on the devices, in order to access this information. Although some tools for collecting and analyzing monitoring information are available, usually these tools must be manually configured to indicate the location of the needed information and/or how to extract it. They are thus inefficient and difficult to use.

SUMMARY OF THE INVENTION

The present invention is directed to a method and system of using an expert's knowledge of the manner in which different computer systems provide performance information in order to allow a user to quickly and conveniently access this performance information.

The present invention is directed to a method and system for interfacing with various monitoring information sources from one or more computer systems with minimal user input. A computer system may include one or more computers as well as any number of devices such as networking devices. Another aspect of the invention is the embedding of expert knowledge in data source monitoring software. These sources can later be used by data collection tools in order to extract monitoring information, and present the information to the user or use it in another way (such as storing it or raising an alert when a certain monitored value exceeds a threshold). Furthermore, the user may decide which sources of information should be monitored by the data collection tools. The user may also use the present invention in order to inform him/herself of the configuration of the system he/she is monitoring.

Another aspect of the present invention relates to collecting certain configuration information (meta information) of the computer system and network environment. Such information may include information regarding the setup of the system being examined, such as the number of processors or the operating system version, or even the various computers or devices that make up the system. The meta information may be used to identify possible performance information sources. The meta information may also be presented to the user, together with the available performance data sources, in order to inform the user of the configuration of the system being monitored.

Utilizing the present invention in conjunction with tools for collecting monitoring information, the user may view various pieces of monitoring information from various computer systems, without having to specify the sources of this information. The user need not know the particular way each application stores or provides performance information. User involvement in the gathering of the information is required only when absolutely needed—for example when an unknown password is needed to obtain the performance data of a certain application.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DETAILED DESCRIPTION OF THE EXEMPLARY EMBODIMENTS

Figure 1:
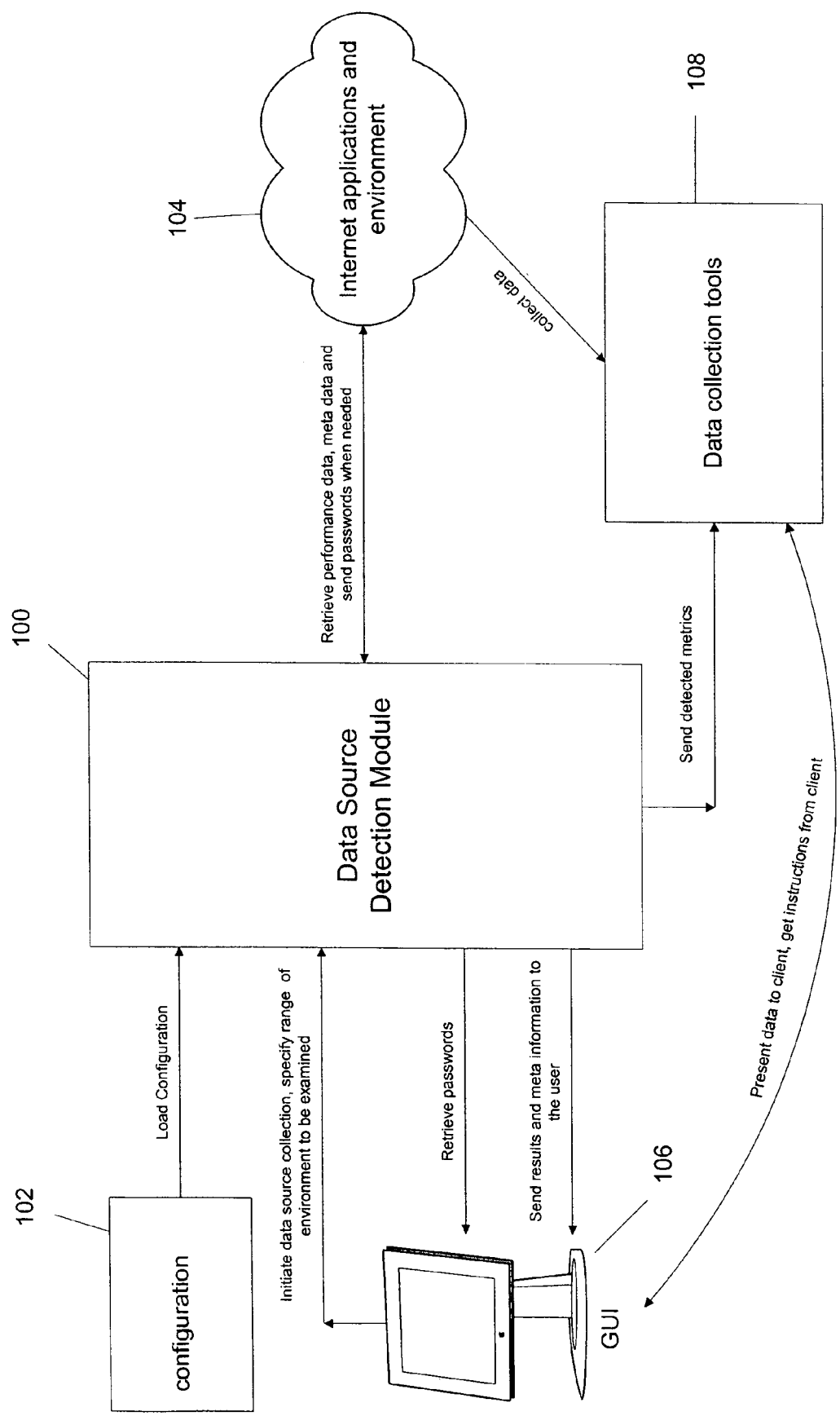
FIG. 1 is a block diagram of an exemplary embodiment of the present invention.

FIG. 1 is a block diagram showing the major components of an exemplary embodiment of the present invention. A data source detection module 100 utilizes a configuration 102 in order to acquire instructions on how to probe environment 104 for meta and performance information. The graphical user interface (GUI 106) enables the user to interact with the data source detection module 100, and optionally with the data collection tools 108 as well. Alternatively, the data collection tools 108 may use a different GUI to interact with the user. Once the data source detection module 100 identifies performance information sources, it may inform one or more data collection tools 108 of all or some of these performance information sources.

Figure 4:
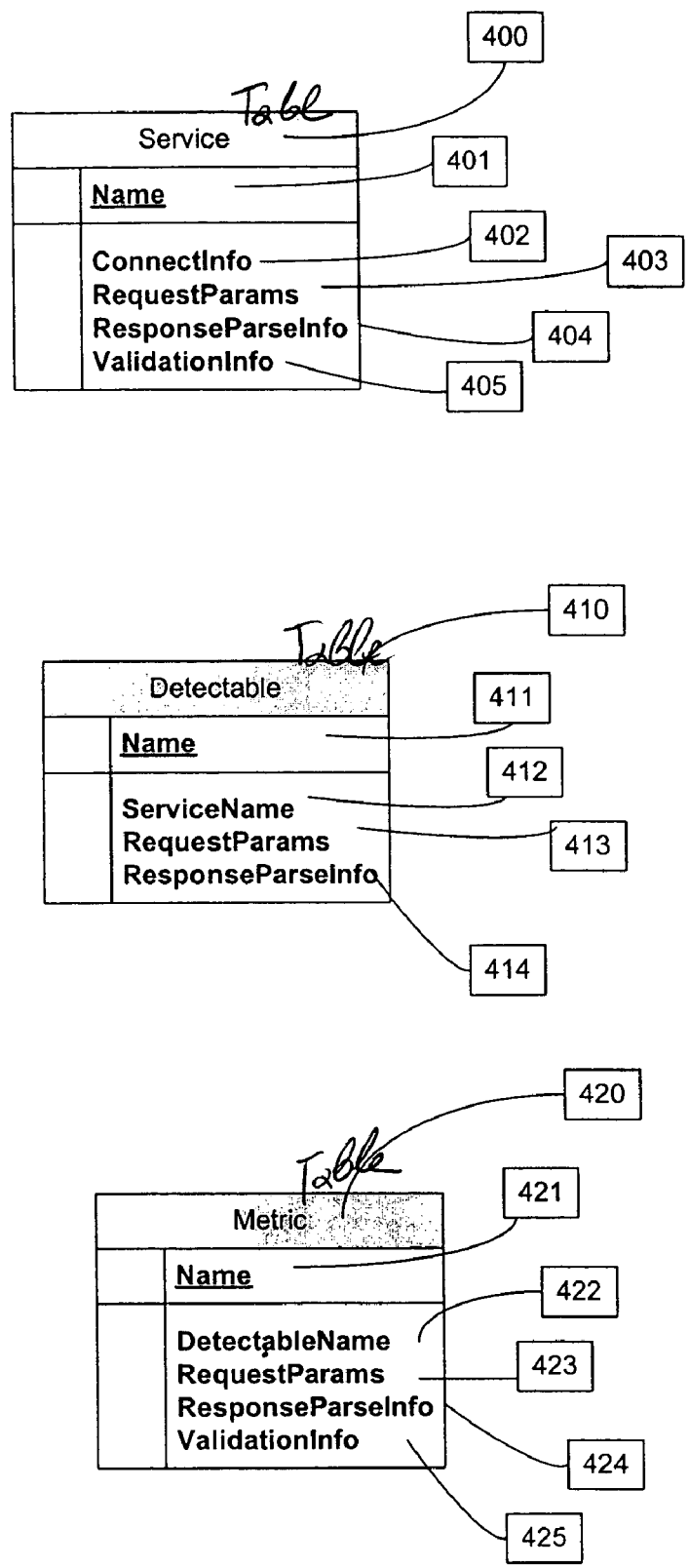
FIG. 4 is a diagram showing data structures within the configuration.

A configuration 102 is used to describe which applications or computers are to be queried and how they are to be queried. FIG. 4 is a schematic representation of an exemplary configuration. Other configuration formats, such as for example using XML, are also possible.

The configuration 102 includes the necessary information to query servers and/or applications that may be used by a client. Different configurations may be used for different clients, and may be updated as new servers and/or software applications appear or become popular. It should be noted that while customizing the configuration 102 for particular clients may be beneficial, one does not need to know the exact set of applications a client is running in order to create a configuration. In other words, the client's hardware and software will typically be a subset of all the hardware and software described in the configuration 102.

Figure 2:
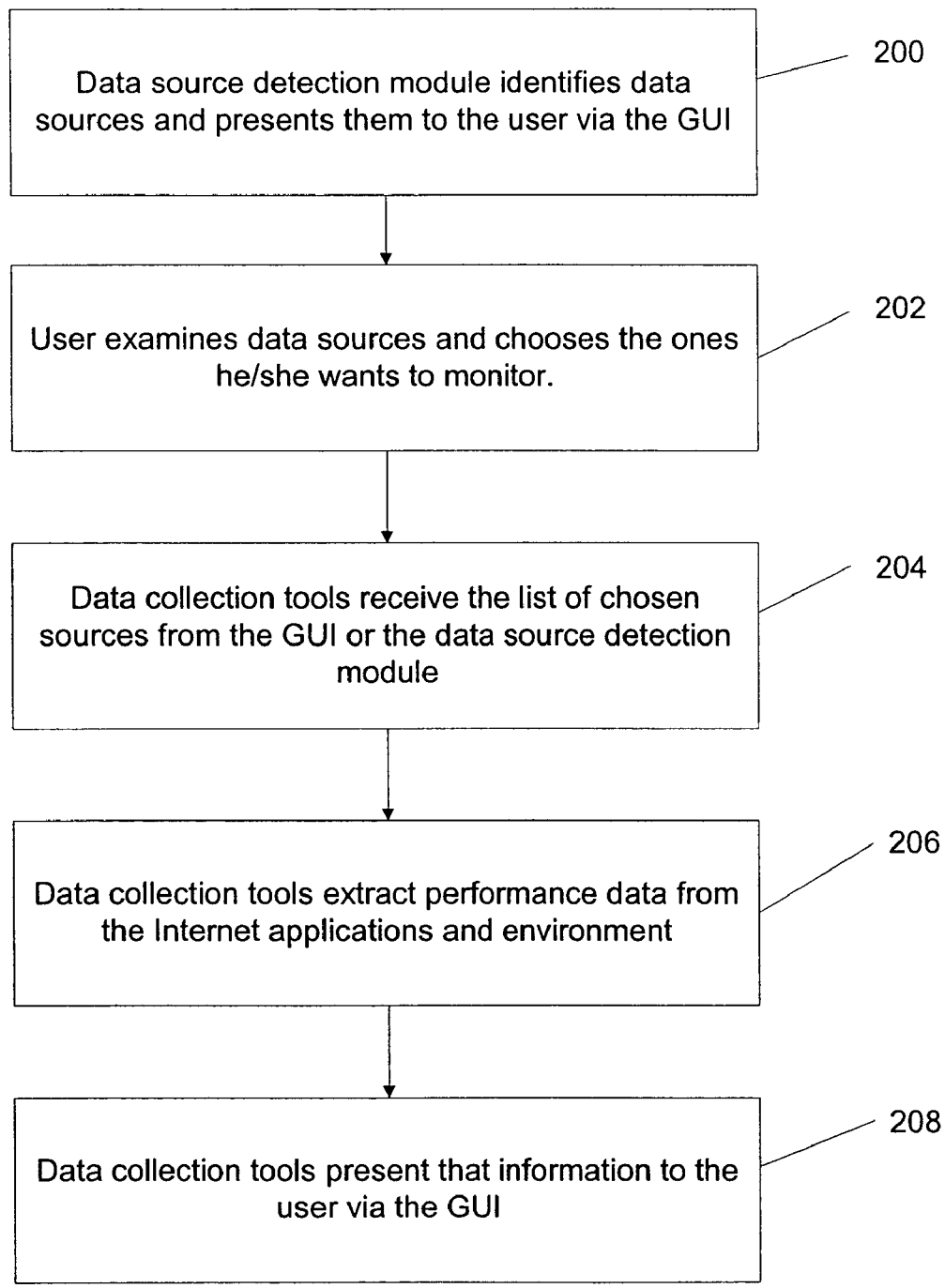
FIG. 2 is a flow chart of interaction between the data source detection module, the data collection tools and the user.

FIG. 2 shows the interaction between the data source detection module, the user and the data collection tools. In step 200, the data source detection module 100 identifies the data sources in the Internet applications and environment 104 and presents them to the user via the GUI 106. In step 202, the user examines the data sources and selects the ones he/she wants to monitor, using the GUI 106. In step 204, the data collection tools receive the list of sources selected by the user. These sources can be received from the GUI or from the data source detection module. Alternatively, some information about these sources may be received from the GUI and some from the data source detection module. In step 206, the data collection tools extract performance data from the Internet applications and environment. Such extraction can be performed at one time or continuously depending on the particular data source and/or instructions entered by the user. At step 208, the data collection tools present the extracted information to the user via the GUI. Such presentation may be performed in a manner that is informative and helpful to the user, such as using graphs or charts.

Figure 3:
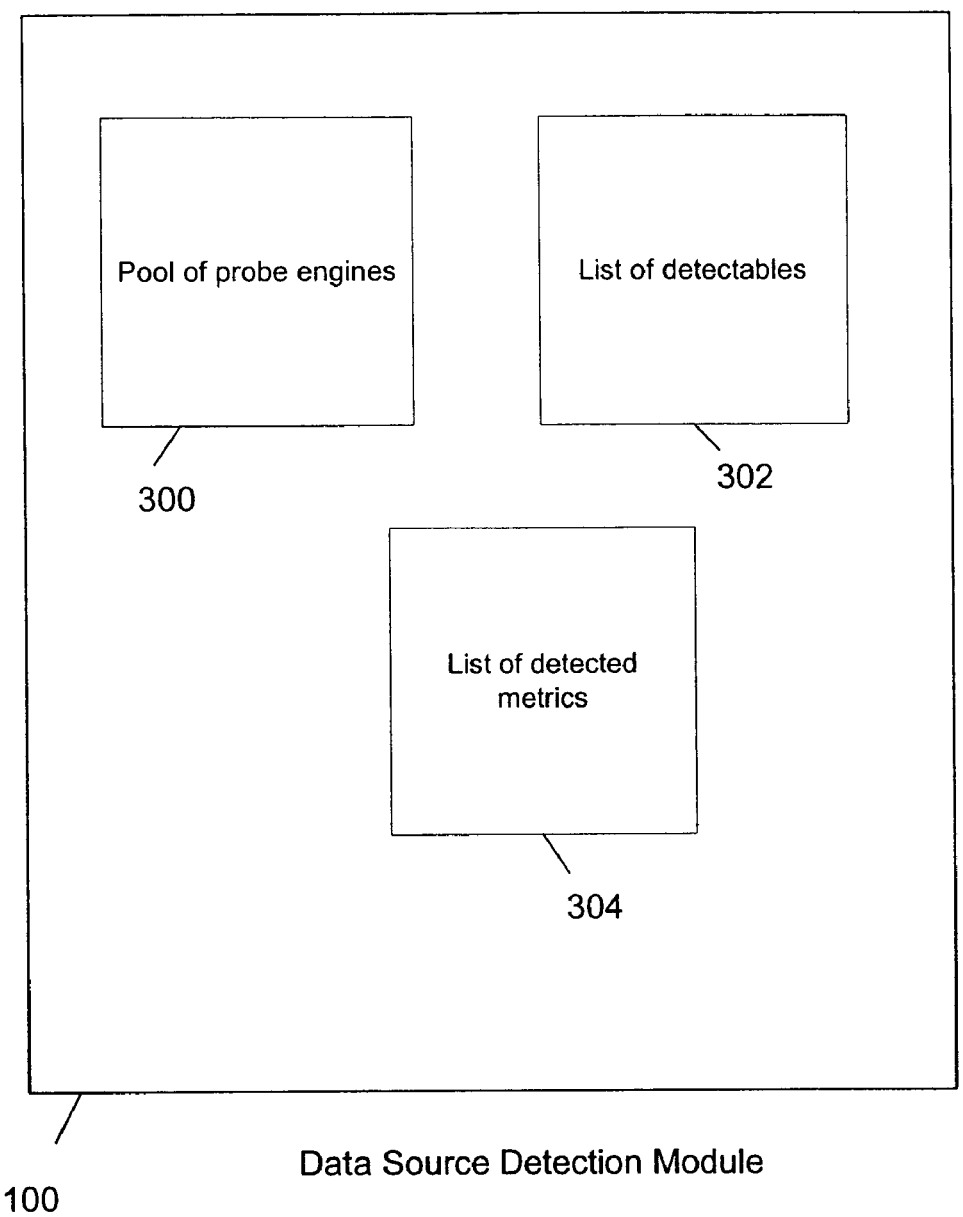
FIG. 3 is a block diagram of the data source detection module.

As shown in FIG. 3 the data source detection module 100 includes a pool of probe engines 300, a list of Monitoring Information Source (MIS) 302 and a list of detected and validated monitoring data sources (or detected metrics) 304. A Monitoring Information Source is an element of a computer system for which there potentially exists relevant monitoring information. For example, given a computer with four processors, each processor is an MIS. Relevant monitoring information for each processor may include CPU Utilization, Kernel Time or User Time. An MIS need not actually provide the monitoring information to the data source detection module 100 itself, but is the element with which that information is associated. For example, while a processor may be an MIS, it is probably not a service, because a processor is unlikely to provide monitoring information directly to the data source detection module. It is possible for the same element to be an MIS and a service but it is not required. For example, a web-server that can be queried directly for its monitoring information is both a service and an MIS.

A metric is a piece of monitoring information that is directly related to a certain MIS. Several metrics may be associated with a single MIS, but a metric can only be associated with one MIS. The list of detected metrics 304 is used to accumulate metrics as they are detected by the data source detection module 100. This list eventually becomes part of the results that the data source detection module provides the client or the data collection tools.

A probe engine is a software module used for probing services for monitoring information sources. All probe engines must provide the same well-defined interface in order for the data detection module to be able to use them in a similar way. In normal operation the data source detection module 100 may contain multiple instances of several types of probe engines which make up the probe engine pool 300. A separate instance of a probe engine is used in conjunction with each separate service. Different types of probe engines are provided for different types of services. For example, a certain type of probe engine may be used for a command line based service, while another type of probe engine may be used for a GUI based service. Each probe engine implements the specific logic needed to communicate with a particular type of service. Probe engines may be added or removed from the data source detection module 100 in order to update it. New probe engines may be added in order to support new services.

Configuration 102 includes a Service Table, an MIS Detection Table and a Metric Table. FIG. 4 shows a Service Table row 400, a Detection Table row 410, and a Metric Table row 420. Only a single row from each table is shown. Each row of the Service Table 400 describes a service that can be possibly used to provide monitoring information for the environment. Similarly, each row of the MIS Detection Table 410 describes the information needed to discover an MIS in the environment and each row of the Metric Table 420 describes a metric that can possibly be obtained for a particular MIS.

Service table row 400 contains several fields, such as the Name field 401 which specify the service name. The service name is used by the data source detection module to determine which probe engine type to use for that particular service. The ConnectInfo field 402 contains information needed to connect to the particular service. Such information may be a port number, for example. The information in the ConnectInfo field is in a form tailored for the particular probe engine that will be used for the service. For example, the ConnectInfo field may contain the number 512, and the probe engine handling the object may be configured to treat that number as a port number. Fields 403, 404, 405, 412, 413, 414, 422, 423, 424, 425 are similarly tailored to the type of probe engine that will process them. The RequestParams field 403 is used to describe the request that the probe engine should use to access the service. The request specified in field 403 is used by the probe engine to validate the service and to gather meta information from the service. The RequestParams field may include a command line such as "mpstat". It may also include parameters that are meant to be used with a command line. The ResponseParseInfo field 404 is used to specify how the response from the service is to be parsed. An example of the contents of field 404 is "get column 2" or just "2", which may be interpreted by the probe engine to mean "get column 2". The ValidationInfo field 405 is used to specify a test which must ensure that the service is valid, i.e., present and functioning. An example of field 405 contents is "OS Version", which may be interpreted by the probe engine to mean "service is valid if the parsed information contains string 'OS Version'."

MIS Detection Table row 410 contains several fields as well. The Name field 411 provides the name of the MIS. The ServiceName field 412 contains the name of the service with which the MIS is associated. An MIS is associated with the service that provides data about that MIS. The RequestParams field 413 is similar to the RequestParams field 403. The difference is that field 413 contains request information that is needed to obtain data pertaining to the MIS. The ResponseParseInfo field 414 is similar to the response parse info field 404. However it is used to parse for information about MIS and not for meta data or service validation information.

The Name field 421 of the Metric Table row 420 is used to specify the name of a metric. The MISName field 422 is the name of the MIS with which the metric is associated. The RequestParams field 423 is similar to field 403 and 413 but it specifies request parameters for retrieval of the metric. The ResponseParseInfo field 424 is similar to fields 404 and 414 but it describes how information relating to the metric should be parsed. The ValidationInfo field 425 describes a test that should be used to ensure that the metric is valid. This test differs from the test described in field 405, because a service may be valid, but it may be unable to provide valid information regarding a certain metric. For example if a service for some reason is unable to provide a processor utilization rate, it may display an "X" in the space where this information is meant to be provided to indicate that no information is available. In such a case field 425 will describe a test whether or not an "X" is present.

Before data source detection is initiated, the list of detected monitoring information sources 302 and the list of detected metrics 304 are empty. The pool of probe engines contains a single probe engine of each possible type. The user initially specifies the scope of the environment 104 to be examined. The user can do this by entering a list or a range of network addresses of the computers or devices (machines) that are to be examined.

Figure 5:
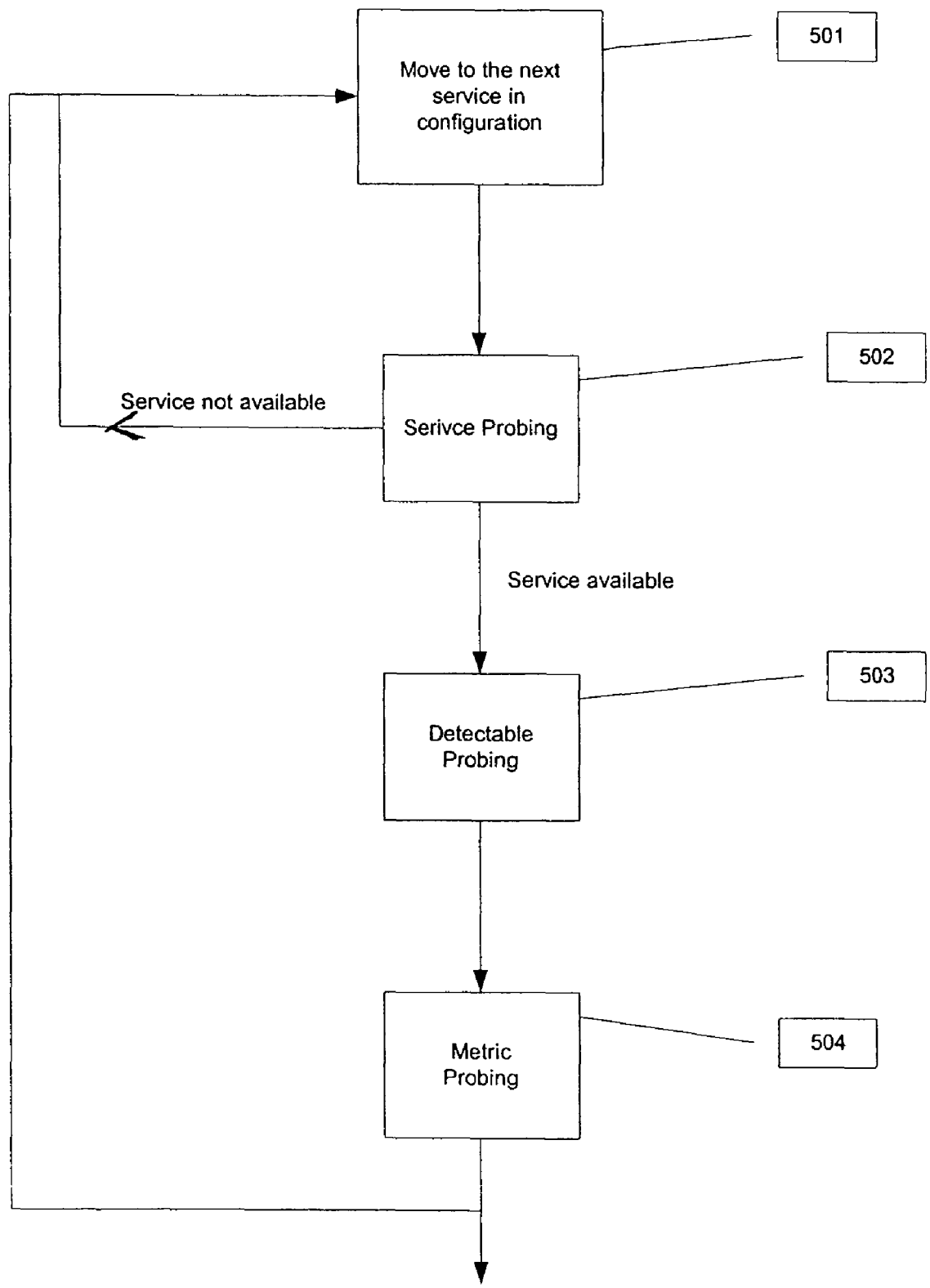
FIG. 5 is a flow chart of the data source detection process.

The data source detection module loads the configuration 102, and performs the process described in FIG. 5 for each machine in the environment. In step 501 the data source detection module picks up the first row in the service table in the configuration 102, or if that row has already been processed, the next unprocessed row in the service table. The data source detection module probes the environment 104 in step 502 to determine if the service described by the current row in the service table is available. When it processes a row in the service table the data source detection module 100 activates a probe engine from the pool of probe engines. The type of the activated probe engine depends on the type of service described in the particular row. The type of service is determined by the Name field 401 in the service table.

The probe engine loads the information from the service table and starts the process of probing for a service, described in the service table. The probe engine uses the information in the ConnectInfo 402 field to determine where it should look for the service. If a service is available the probe engine moves on to step 503 where it identifies the MIS(s) for which the service is providing information. These MISs are stored in the list of detected MISs 302. Once the MISs are stored and identified the probe engine in step 504 finds and validates all the metrics that are associated with any of the MISs. Steps 502, 503 and 504 are shown in more detail in FIGS. 6, 7 and 8, respectively.

Figure 6:
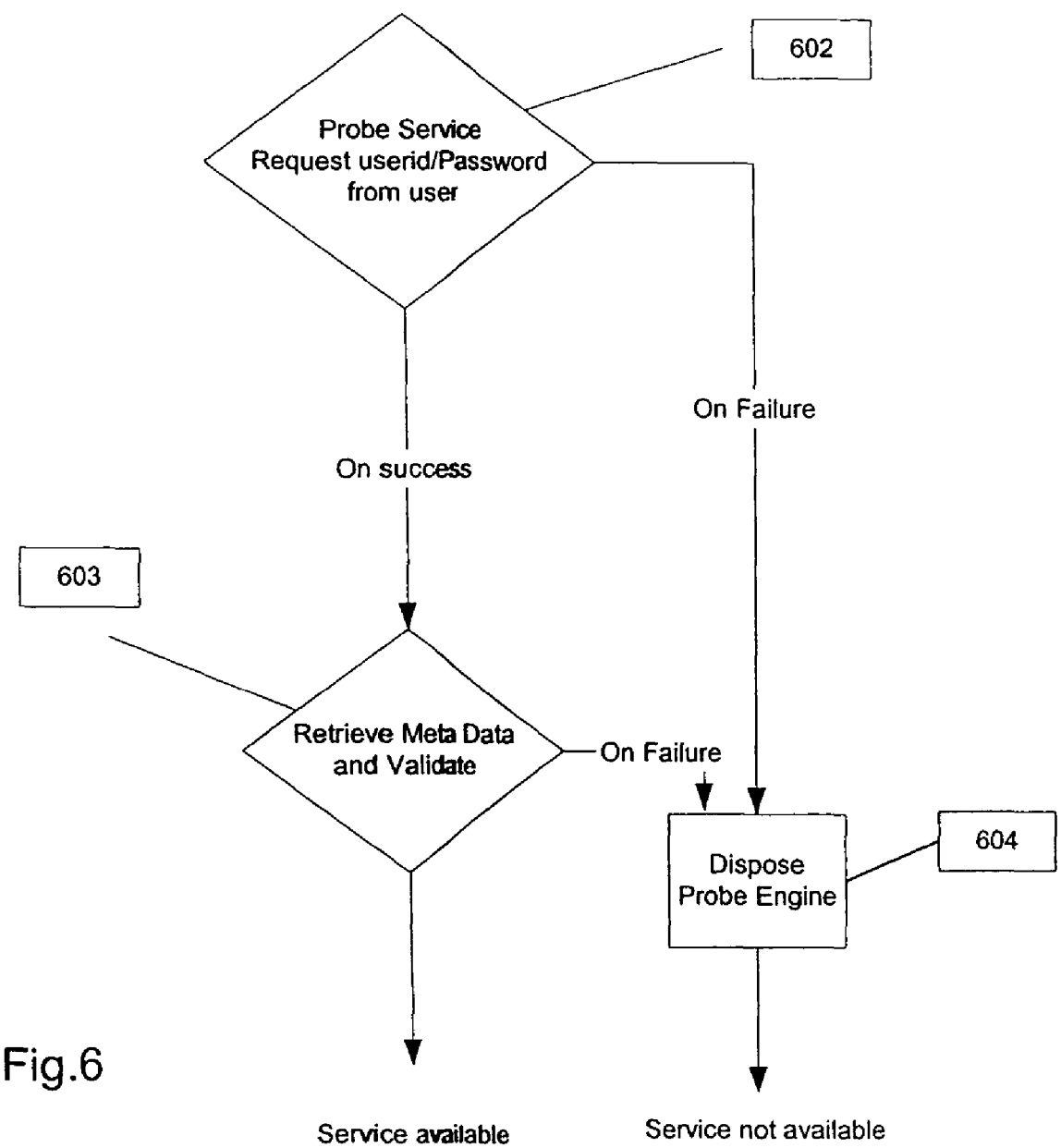
FIG. 6 is a flow chart of the service probe.

Probing for services means that the probe engine verifies whether the service is responding (step 602 in FIG. 6). If authentication is required for accessing the service, the data source detection module 100 will ask the user via GUI 106 for authentication data, such as username and password. If the service is responding, the service is used to determine meta information of the environment the service is running in. This meta information is requested in step 603 by the probe engine using the request parameters 403. Request parameters 403 may include a command which the probe engine is to provide to the service. Meta information may include, for example, the version of the operating system or the version of the service. The probe engine parses the response using the response parse information 404 and validates it using validation information 405. If, on the other hand, at step 602, the service is not responding, the probe engine is returned into the pool of probe engines (step 604), the service is identified as not available, and a new row in the service table is processed.

Figure 9:
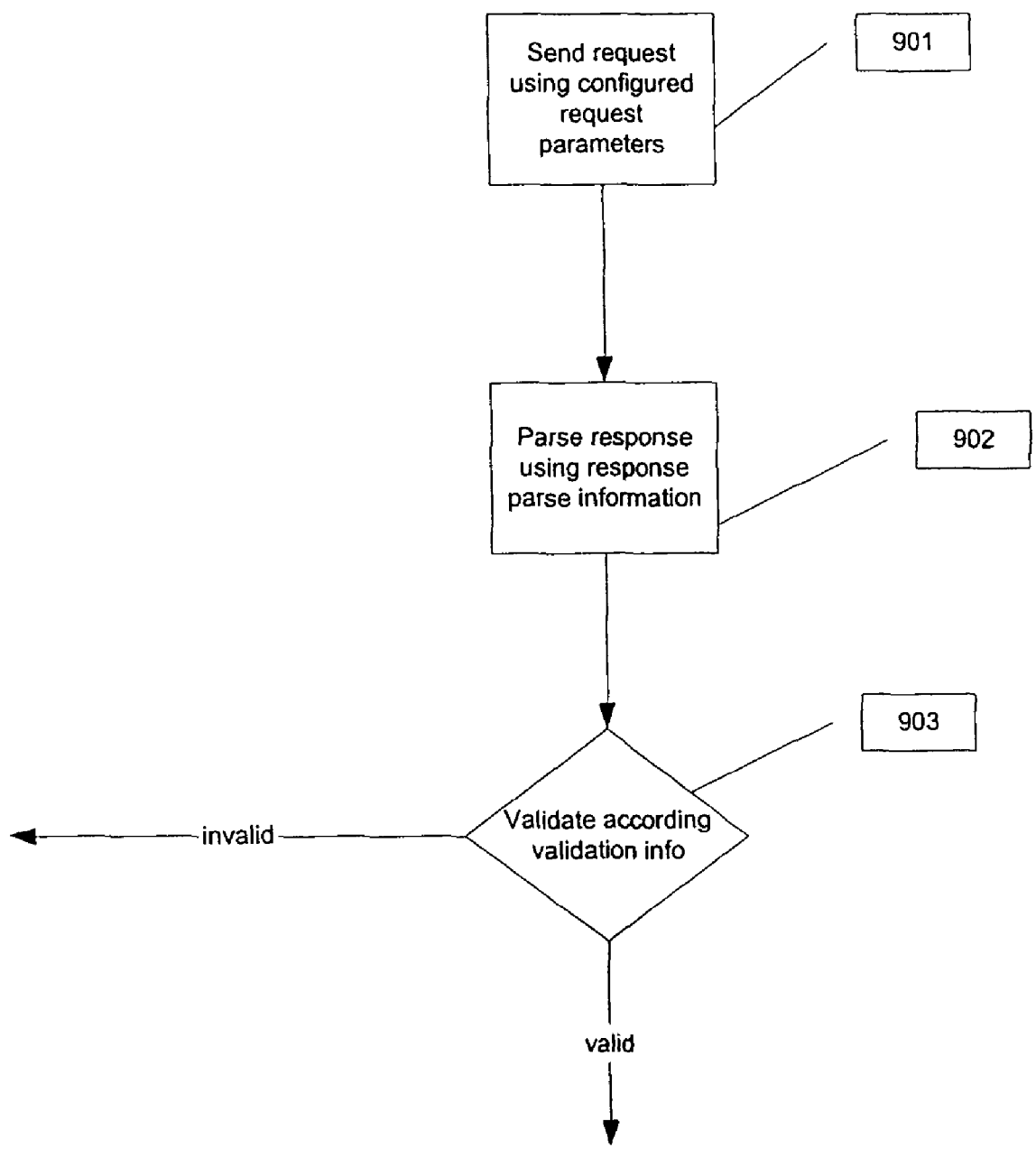
FIG. 9 is a flow chart of a validation process.

The process of validation is similar for services or metrics and is shown in FIG. 9. At first in step 901 a request is sent to a service according to the request parameters. These request parameters can be the service request parameters 403 or the metric request parameters 423 depending on whether a service or metric is being validated. Subsequently, in step 902 the response is parsed using response parse information 404 or 424. Finally, at step 903, validity is determined according to the parsed response and a condition contained in the validation information 405 or 425. The result of a validation process is either valid or invalid. An invalid result means that the particular service or metric being validated does not exist. A valid result means it does exist.

Each service which is successfully probed (probing process 502) is used by the data source detection module 100 for the subsequent MIS probing process 503 and the metric probing process 504.

Figure 7:
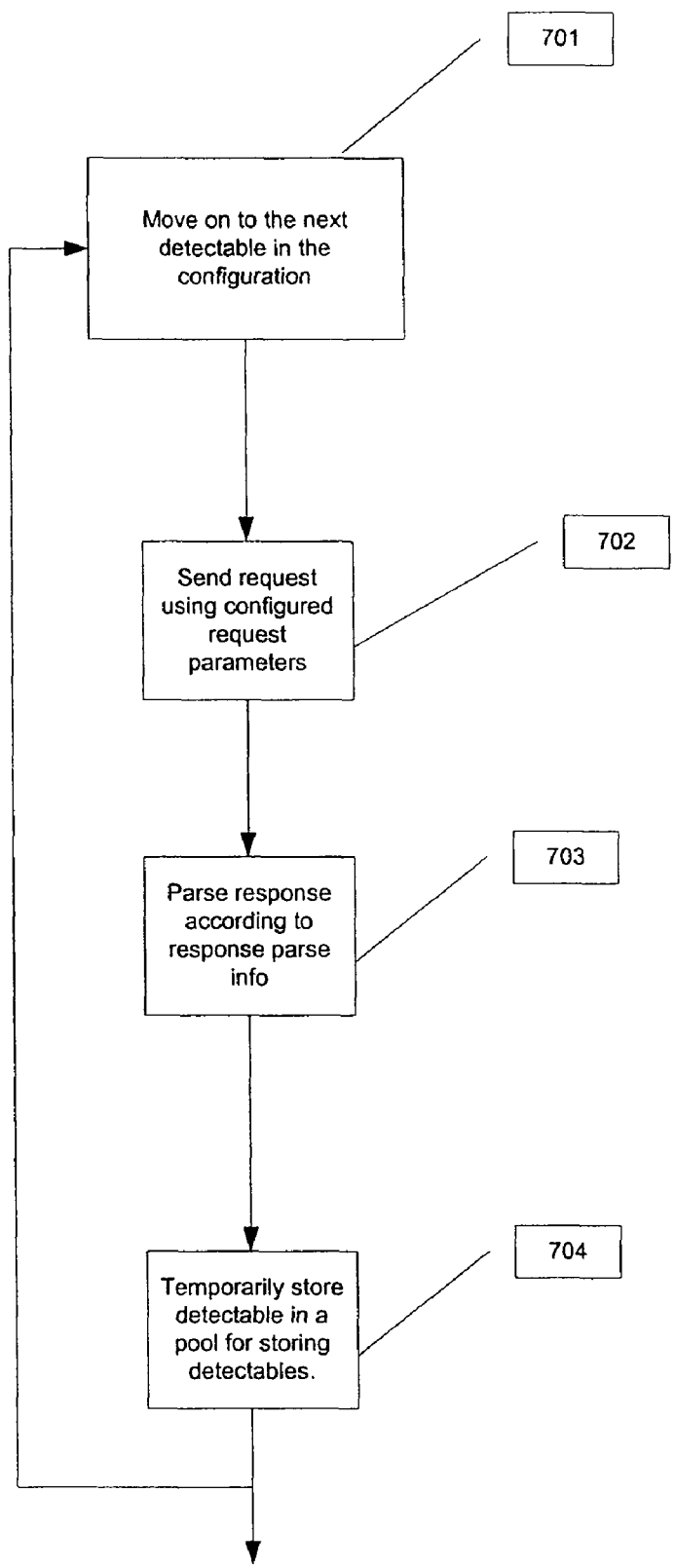
FIG. 7 is a flow chart of the probing process for MISs.

The MIS Probing process 503 is illustrated in more detail in FIG. 7. In step 701 the probe engine picks up the next (or the first) row in table 410 of the configuration. In step 702, the probe engine sends a request to the corresponding service using the request parameters 413. In step 703, the response is processed by the probe engine. In the processing step the probe engine identifies all available MIS instances using the response parse information 414. If any MIS instances are extracted in step 704 they are stored in the list of detected MISs 302. A probe engine may find several instances of MISs, all corresponding to a single row in table 410 in the configuration 102. For example, the MIS detection table may contain one row corresponding to a processor but the service may report that a certain computer has several processors. If this is the case several entries, one for each found MIS, are stored in the list of detected MISs 302, and each stored instance is accompanied with an unique ID.

Figure 10:
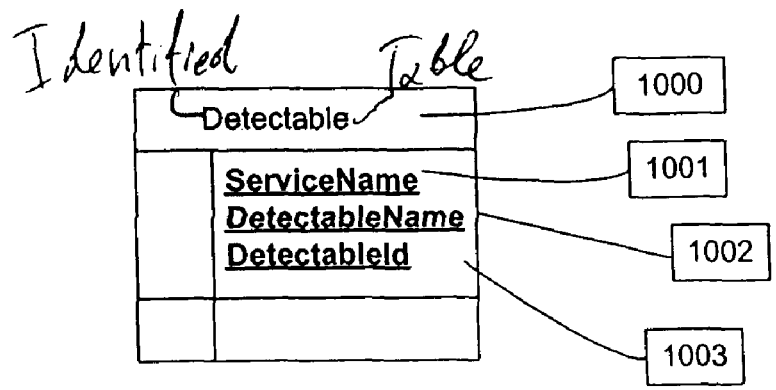
FIG. 10 is a diagram of a detected metric within a list of detected metrics.

The list of detected MIS 302 is preferably implemented as a detected MIS table. Each row in the table represents one detected MIS instance. An example of such a row is shown in FIG. 10. The ServiceName field 1001 in the row specifies the service with which the MIS instance was detected. The same service will be used later in order to probe the MIS for the metrics specified in the metric table. The ServiceName field 1001 corresponds to ServiceName field 412 of the MIS detection table row 410. The MISName field 1002 similarly corresponds to the Name field 411. The MIS_ID field 1003 is a unique identification of the MIS instance. As mentioned above more than one MIS instances can be found that correspond to the same MIS type specified by a row in MIS detection table 410. This is because a single service may list information for multiple MIS instances of the same type, e.g., multiple processors. The instance identifications of a particular MIS type is the result of the MIS probing process. The instance IDs are stored together with the associated service name and MIS name in the MIS_ID field 1003, ServiceName 1001 field and MISName field 1002 in the detected MIS table 1000.

Once the probe engine is finished with the MIS Probing process 503, it has to examine what kind of monitoring information is available for the found MIS stored in the list of detected MISs 302. The probe engine queries and validates various pieces of monitoring information (metrics) for each row in the list of detected MISs 302 by referring to the metric table, in the configuration 102.

Figure 8:
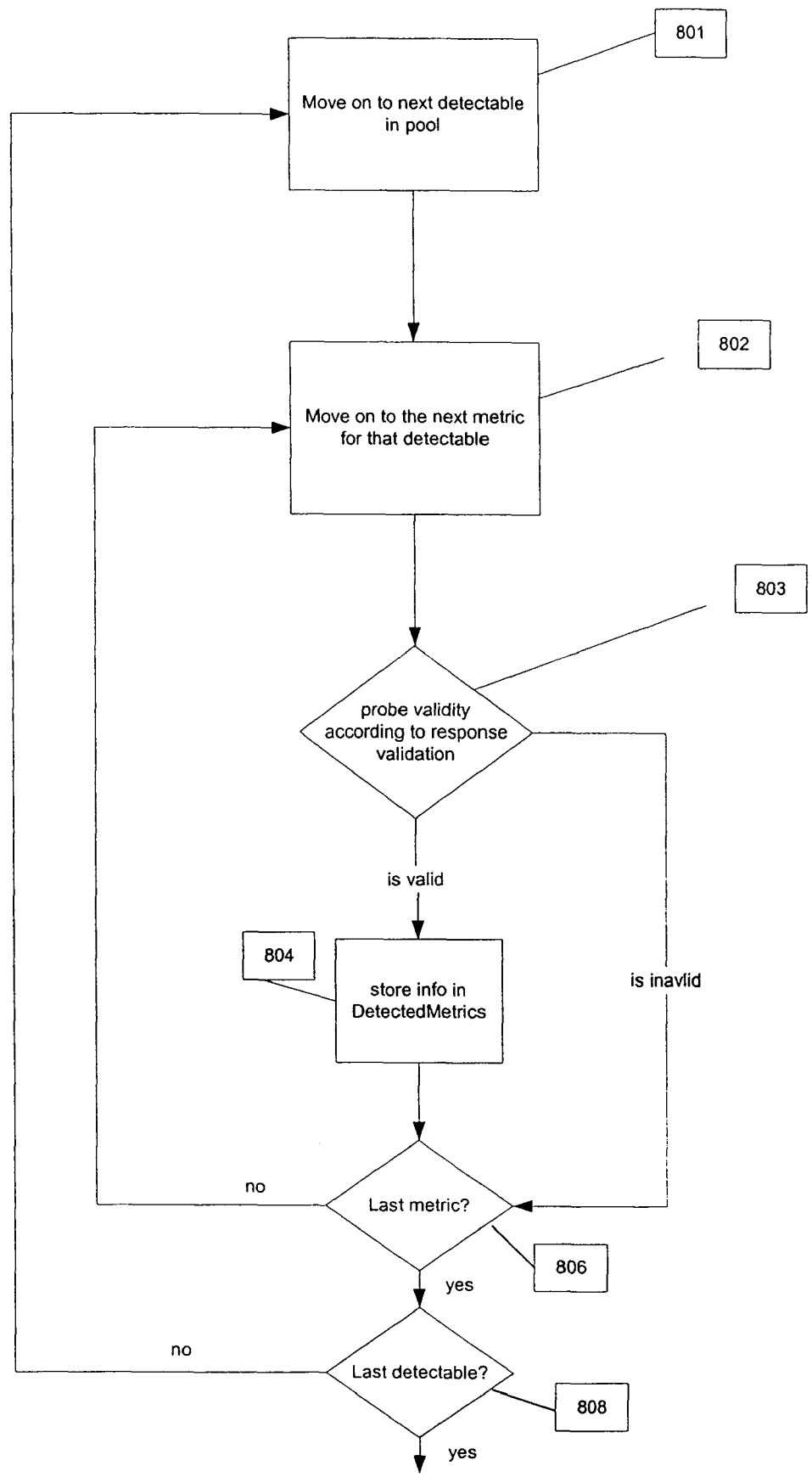
FIG. 8 is a flow chart of a method for probing metrics.

The metric probing process is shown in FIG. 8. In step 801 the probe engine moves on to the next (or the first) MIS in the list of detected MIS. In step 802 the probe engine moves on to the next (or first) metric associated with the current MIS. The probe engine determines which metrics are associated with the current MIS by examining the MISName 422 field of the metric. In step 803 the probe engine probes for the validity of the metric by making a request to the service, using the RequestParams field 423 of the metric, parsing the response in accordance with the ResponseParseInfo 424 of the metric and checking whether the metric is valid by using the test described in the ValidationInfo field 425 of the metric. If the metric is valid it is stored in the list of detected metrics 304 (step 804). Steps 806 and 808 cycle to the next metric for the current MIS, or the next MIS if all the metrics for the current MIS have been processed.

Figure 11:
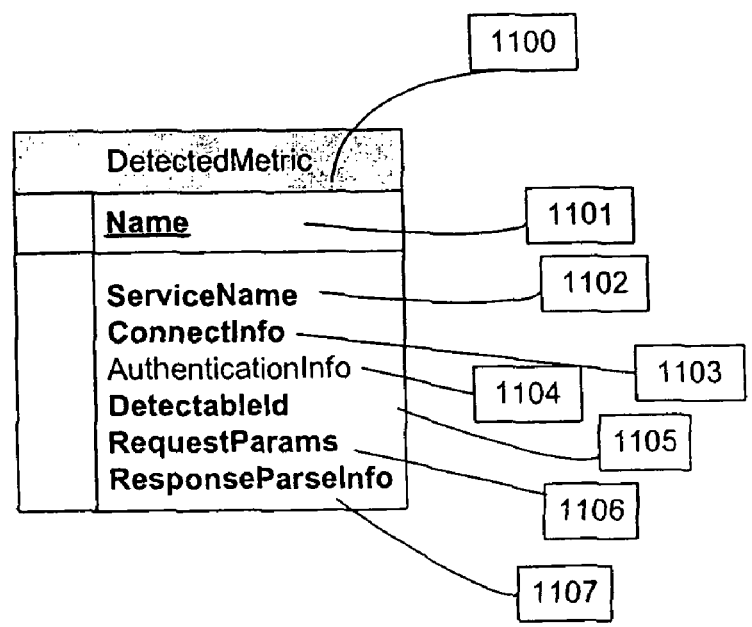
FIG. 11 is a diagram of a single MIS within a list of MISs.

Each detected metric in the list of detected metrics 304 is represented as a row in a DetectedMetric table. An example of such a row is shown as 1100 in FIG. 11. The Name field 1101 in the DetectedMetric table 1100 differs from the Name field 421 in the metric table row 420 in the configuration 102. It is a combination of the name of the MIS to which the metric refers to (422) and the metric Name (421). The ServiceName 1102 is the service which was queried to validate the metric. It is taken from the service name 1001, corresponding to the MIS instance in the list of detected MISs 302 with which the metric is associated. The ConnectInfo field 1103 is taken from the ConnectInfo field 402 of the service which provided the metric. The AuthenticationInfo field 1104 is set to contain the authentication information, if any, that was requested from the user in order to access the service that provided the metric. The MIS_ID 1105 is taken from the MIS_ID 1003 of the same MIS. The RequestParams 1106 field is set to the value of RequestParams field 423, the ResponseParseInfo field 1107 is set to the current value of ResponseParseInfo field 424.

Figure 12:
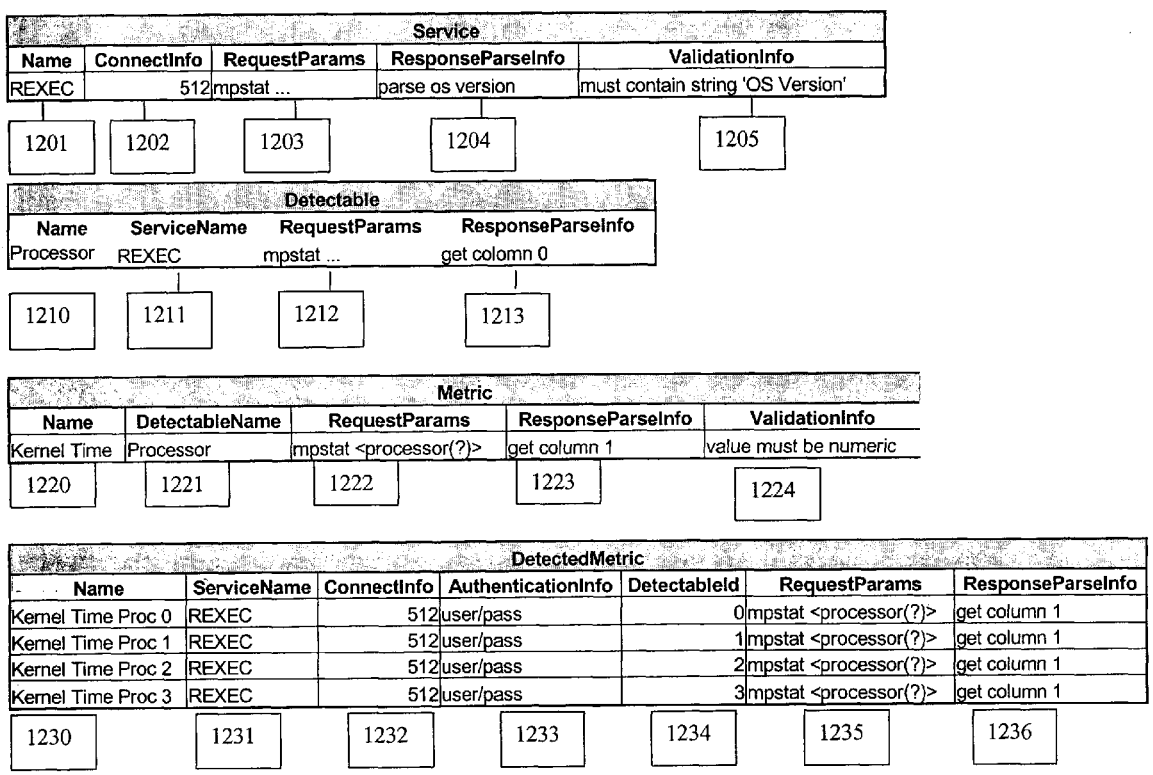
FIG. 12 is a diagram of an exemplary configuration and the list of detected metrics.

FIG. 12 illustrates an exemplary configuration and list of detected metrics. In this example a machine running SunOS is queried, its CPUs are the MIS and the REXEC daemon is the service. Several of the data structures are shown with appropriate values. Service table 1240 corresponds to service table row 400, thus fields 1201, 1202, 1203, 1204, 1205 correspond to fields 401, 402, 403, 404 and 405, respectively. MIS detection table 1250 corresponds to table row 410, and fields 1210, 1211, 1212 and 1213 correspond to fields 411, 412, 413 and 414, respectively. Metric table 1260 corresponds to table row 420 and fields 1220, 1221, 1222, 1223 and 1224 correspond to fields 421, 422, 423, 424 and 425, respectively. The list of detected metrics corresponds to the list 304, where each detected metric table in the list is represented as a row. Fields 1230-1236 correspond to fields 1101-1107, respectively.

With reference to the MIS probing process shown in FIG. 7 and the example of FIG. 12, the probing engine reaches MIS detection table 1250 in the configuration (step 701). In step 702 the request parameter 1212 requires the execution of the command line tool "mpstat" via the REXEC daemon. The probe engine uses the request parameter 1212 and causes the REXEC daemon to execute "mpstat". An exemplary result is:

| 0 | 15 | 0 | 25  | 105 | 105 | 50 | 0 | 0 | 4 | 0 | 98 | 0 | 1 | 2 | 97 |
|---|----|---|-----|-----|-----|----|---|---|---|---|----|---|---|---|----|
| 1 | 16 | 0 | 30  | 100 | 100 | 49 | 0 | 0 | 4 | 0 | X  | X | X | 2 | 98 |
| 2 | 15 | 0 | 27  | 112 | 112 | 49 | 0 | 0 | 4 | 0 | 97 | 0 | 1 | 1 | 98 |
| 3 | 16 | 0 | 341 | 439 | 238 | 46 | X | X | X | X | 90 | 0 | 0 | 4 | 96 |

This exemplary result identifies four processors, each processor being described by a row. The first column is a processor identification number, and the following columns are the values of various metrics, wherein an "X" signifies that the corresponding metric is not available. The probe engine reads the response and extracts the MIS identifications according to the response parse parameter 1213 (step 703). The response parse parameter 1213 signifies that the MIS identification is saved in the very first column (column 0). The response consists of four rows, and therefore the probe engine will place in the list of detected MISs 302 four instances of MISs with the MISName fields 1001 set to "Processor" and MIS_ID fields 1003 set 0, 1, 2 and 3, respectively (step 704). These four instances represent the four processors. Of course, other scenarios are possible when other probe engines, operating systems and/or services or daemons are present.

With reference to the metric probing process shown in FIG. 8 and the example of FIG. 12, step 801 finds the first MIS instance present in the list 302, i.e., the first processor. In step 802 the only metric (Kernel Time) is picked up because it is associated with the first processor. In step 803 the data source detection module attempts to verify that for processor(0) the kernel time can be queried and will provide valid information. Based on the RequestParams field 1222, the probe engine will cause the REXEC daemon to execute a command line tool called "mpstat". In this example, the command returns the following string for processor(0):

| 0 | 15 | 0 | 25 | 105 | 105 | 50 | 0 | 0 | 4 | 0 | 98 | 0 | 1 | 2 | 97 |

In this resulting string the Kernel Time is represented by the second column (identified as column 1, since the first column is column 0). The probe engine will pick up column 1 based on ResponseParseInfo field 1223. The probe engine will successfully verify the value of column 1, based on the ValidationInfo field 1224, because it is a number. In step 804 the verified metric for the first processor (Proc 0) is stored as a row in the list of detected metrics 1270. Similarly the same metric for the other three processors is stored.

Once all services listed in the configuration are queried, the validated monitoring information sources and the validated metrics containing information about the MISs are obtained. This process is repeated for each machine in the user specified environment to retrieve similar MISs and metric groups for each such machine. Thus, the invention produces a description of what monitoring information is available and how this information can be accessed. The resulting information may be presented to the user via the GUI 106 or sent to data collection tools 108, as described in FIG. 1.

A graphic user interface 106 is used to communicate with the user. The GUI 106 allows the user to initiate data collection, view the results, and enter passwords if needed. The GUI may also interface with one or more data collection tools 108, that are used in conjunction with the data source detection module. The data source detection module may either store the results to a file or it may be queried for its results.

The data collection tools 108 are tools that use the data sources or performance information sources, identified by the data source detection module, in order to collect performance information from them.

The data source detection module 100 may be running from within the environment 104 it is examining, i.e., on an Internet server. It may also run on a remote computer and query the environment 104 through the Internet or another computer network. Similarly, the GUI 106 may run on the same computer as the data collection module 100, or it may run on a different computer or on a terminal and communicate with the data collection module 100 through a computer network. The configuration 102 can be stored locally or remotely. The data collection tools 108 may also be running on a local or remote machine, related to the other elements. When remotely used, this invention is not "intrusive" and cannot directly impact reliability of the target system 104.

While the foregoing description and drawings represent illustrative embodiments of the present invention, it will be understood that various changes and modifications may be made without departing from the spirit and scope of the present invention.

We claim:

1. A method for automated detection of monitoring data sources of at least one remotely located computer system in a network environment, said method comprising:

providing a configuration containing instructions that query at least one of said at least one remotely located computer system, said configuration comprising a service table identifying one or more services provided by the remotely located computer systems to monitor said at least one computer system, the services being non-monitoring specific and the remotely located computer systems absent the monitoring computer program, a detection table identifying information to detect at least one of the monitoring data sources, and a metric table identifying a metric for the at least one of the monitoring data sources;

providing a data detection module configured to generate multiple service probe requests to detect configured to identify different services at two or more remotely-located computer systems that are unidentified;

identifying, by said data detection module using said configuration, accessible data sources of at least one of said at least one computer system, the accessible data sources being different from that at another computer system;

using subsets of metric probe requests to collect from at least one of said computer systems meta and performance information of said accessible data sources of at least one of said at least one computer system, the meta and performance information comprising a response from at least one of the services provided by the remotely located computers systems, whereby one subset of the metric probe requests is based on identification of the at least one of the services and another subset of the metric probe requests is based on identification of another one of the services;

presenting said meta and performance information to a user;

presenting a list of said identified accessible data sources to said user, wherein said list of said identified accessible data sources is derived using the different services;

transmitting sets of service probe requests including a first set of service probe requests and a second set of service probe requests to detect services in the remotely-located computer systems;

transmitting a number of monitoring information source ("MIS") probe requests for each of the services that causes responses to the sets of service probe to detect a subset of MISs; and associating each MIS of the subset of MISs with one of the services to form an association that is stored in a MIS detectable table, wherein the MIS detectable table includes data from different services.

2. The method according to claim 1, further comprising the step of:

receiving access information from said user, wherein said access information comprises one member of the group consisting of a username and a password.

3. The method according to claim 1, further comprising the steps of:

receiving a list of data sources chosen by said user;
extracting said meta and performance data from said chosen data sources; and
presenting said meta and performance data to said user.

4. The method according to claim 1, further comprising the step of:

utilizing a probe engine to verify whether a service of one of said at least one computer system is responding, and
determining, said meta and performance data of an environment in which said service is running, in response to said probe engine verifying said service is running.

5. The method according to claim 4, wherein the service probing step is performed for each service of said at least one computer system.

6. The method according to claim 4, further comprising the steps of:

utilizing said probe engine to identify at least one monitoring information source in said at least one computer system, and
storing said monitoring information source in a list of said at least one identified monitoring information sources.

7. The method according to claim 6, wherein the monitoring information source probing step utilizes the probe engine to identify the monitoring information source and storing the monitoring information source in the list of detected monitoring information sources are performed for each monitoring information source of said at least one computer system.

8. The method according to claim 6, further comprising the step of:

utilizing said probe engine to determine a metric associated with each of said monitoring information sources.

9. The method according to claim 1, wherein said meta information comprises set-up information of said at least one computer system.

10. The method according to claim 3, wherein said list receiving step comprises receiving a range of data sources of said network environment, said range being specified by said user.

11. The method according to claim 1, wherein each of said services identified in said service table are associated with a service type, the method further comprising the step of activating a probe engine according to at least one service type, wherein the probe engine probes a monitoring information service to monitor information of the computer system.

12. The method according to claim 1, wherein the step of collecting meta and performance information further comprises populating the list of the accessible data sources, wherein the list of the accessible data sources is initially empty.

13. An apparatus for detecting and monitoring data sources, the apparatus comprising:

a computer having a processor and a memory configured to receive monitoring information from one or more remotely-located computer systems, the monitoring information concerning the operation of the one or more remotely-located computer systems; and a computer-readable medium encoded with executable instructions configured to instruct the computer to:

implement probe engines to generate probe requests that detect services, at least two probe engines being configured to identify different services at the one or more remotely-located computer systems that are unidentified;

transmit a first set of service probe requests and a second set of service probe requests via a network to detect whether a first service and a second service, respectively, are associated with the remotely-located computer systems;

identify that the first service and the second service are available at a first remotely-located computer system and a second remotely-located computer system, respectively;

transmit a first set of metric probe requests and a second set of metric probe requests to the first service and the second service, respectively, to determine a first set of metrics and a second set of metrics, the transmission of the first set of metric probe requests and a second set of metric probe requests is based on responses generated by the first set of service probe requests and the second set of service probe requests;

generate data to present representation of the first set of metrics and the second set of metrics via a graphical user interface;

transmit sets of service probe requests including the first set of service probe requests and the second set of service probe requests to detect services in the remotely-located computer systems;

transmit a number of monitoring information source ("MIS") probe requests for each of the services that causes responses to the sets of service probe to detect a subset of MISs; and associate each MIS of the subset of MISs with one of the services to form an association that is stored in a MIS detectable table, wherein the MIS detectable table includes data from different services.

14. The apparatus of claim 13, wherein the first service and the second service are different services.

15. The apparatus of claim 13, wherein at least one metric probe request from both the first set of metric probe requests and the second set of metric probe requests is transmitted to both the first service and the second service.

16. The apparatus of claim 13, wherein the computer-readable medium encoded with executables instructions further comprises executable instructions to:

transmit sets of metric probe requests for each of the MISs that causes a response to the number of MIS probe requests, the sets of metric probe requests including the first set of metric probe requests and the second set of metric probe requests to detect metrics in the remotely-located computer systems;

detect a subset of metrics; and associate each metric of the subset of metrics with one of the MISs to form an association that is stored in a metric table, wherein the MIS detectable table includes data from the different services, wherein the first set of metric probe requests is a function of the first set of service probe requests and the second set of metric probe requests is a function of the second set of service probe requests.

17. The apparatus of claim 13, wherein the computer-readable medium encoded with executables instructions configured to identify that the first service and the second service are available for the first remotely-located computer system and the second remotely-located computer system, respectively, comprises executable instructions to:
- determine that one of the first service and the second service is a command line-based service; and
- determine that other of the first service and the second service is a graphical user interface ("GUI")-based service.

* * * * *